United States Patent [19]

Okuno et al.

[11] Patent Number: 4,652,708
[45] Date of Patent: Mar. 24, 1987

[54] TANK-TYPE SWITCHGEAR

[75] Inventors: Michiharu Okuno, Takarazuka; Tsutomu Sugiyama, Nishinomiya, both of Japan

[73] Assignee: Mitsubishi Denki Kabushiki Kaisha, Tokyo, Japan

[21] Appl. No.: 785,716

[22] Filed: Oct. 9, 1985

[30] Foreign Application Priority Data

Oct. 11, 1984 [JP] Japan .................. 59-211474

[51] Int. Cl.⁴ ............................................. H01H 33/12
[52] U.S. Cl. .............................. 200/146 R; 200/148 F
[58] Field of Search ........... 200/146 R, 146 A, 148 R, 200/148 F

[56] References Cited

U.S. PATENT DOCUMENTS 1,820,710  8/1931  Rudenberg ............ 200/146 A
3,671,696  6/1972  Brunner ............... 200/146 R

FOREIGN PATENT DOCUMENTS 54-63378  5/1979  Japan .
54-65375  5/1979  Japan .
60-3629   1/1985  Japan .

Primary Examiner—Robert S. Macon
Attorney, Agent, or Firm—Leydig, Voit & Mayer

[57] ABSTRACT

A tank-type switchgear comprises a main contact disposed in a hollow tank and having movable and stationary contact elements, an auxiliary contact disposed in the tank and electrically connected parallel with the main contact and having movable and stationary contact elements, a main lever rotatably connected to the movable contact element of the main contact, an auxiliary lever rotatably connected at one end thereof to the movable contact element of the auxiliary contact, a connecting link for rotatably supporting the other end of the auxiliary lever, a device for rotatably supporting the main lever and the connecting link with respect to the tank, and a driving device for rotating the main lever. The auxiliary lever is rotatably connected to the main lever such that the auxiliary lever rotates in the direction opposite the rotational direction of the main lever.

6 Claims, 5 Drawing Figures

TANK-TYPE SWITCHGEAR

BACKGROUND OF THE INVENTION

The present invention relates to a tank-type switchgear in which movable contact elements of main and auxiliary contacts are moved by driving means through a link mechanism.

In a conventional switchgear of this type, as shown in FIG. 1, a manhole 2 is often formed in the perimeter of a cylindrical tank 1 to make it possible to inspect a main contact 3 or an auxiliary contact 4 disposed in the tank 1. The size of the switchgear has been recently reduced. To reduce the diameter D of the tank and the distance L between the tanks, it is necessary to dispose the manhole 2 along the line B—B, which slants by a predetermined angle with respect to line A—A along which the tanks are aligned. In such a case, for ease of inspection, it is preferable to dispose the main and auxiliary contacts 3 and 4 within the tank 1 along line B—B along which the manholes 2 are arranged.

As shown in FIGS. 2 and 3, the main contact 3 comprises a stationary contact element 5 and a movable contact element 6, and the auxiliary contact 4 comprises a stationary contact element 7 and a movable contact element 8. The stationary contact elements 5 and 7 of the main and auxiliary contacts are electrically connected to a conductor 9 which is electrically insulated from and supported by the tank 1 through an insulated support member 10. The movable contact elements 6 and 8 of the main and auxiliary contacts 3 and 4 respectively oppose the stationary contact elements 5 and 7 and are connected to a link device 13. The link device 12 is disposed within a link box 12 supported by and electrically insulated from the tank 1 through an insulated cylinder 11. The link device 13 comprises an L-shaped main leve 15 rotatably connected to a stationary shaft 14 supported by the box 12, and an L-shaped auxiliary lever 17 rotatably connected to a stationary shaft 16 supported by the box 12. One end of the main lever 15 is connected to one end of the movable contact element 6 through a link 18 and connecting pins 19 and 20 at both ends thereof. One end of the auxiliary lever 17 is connected to one end of the movable contact element 8 through a link 21 and connecting pins 22 and 23 at both ends thereof. The other ends of the main and auxiliary levers 15 and 17 are connected to an insulated driving rod 29 extending into the insulated cylinder 11 through links 24 and 25 and connecting pins 26, 27 and 28. The driving rod 29 is connected to an unillustrated driving apparatus and transmits driving force from the driving apparatus to the link device 13.

In the conventional switchgear described above, as shown in FIG. 2, when the insulated driving rod 29 is driven downwards by the driving apparatus, the main and auxiliary levers 15 and 17 are respectively rotated in the counterclockwise direction around the stationary shafts 14 and 16. The movable contact elements 6 and 8 of the main and auxiliary contacts are then moved leftwards through the links 18 and 21, thereby opening the main and auxiliary contacts 3 and 4. On the other hand, when the driving rod 29 is moved upwards, the main and auxiliary levers 15 and 17 are rotated in the clockwise direction, and the movable contact elements 6 and 8 are moved rightwards, thereby closing the contacts 3 and 4.

In such a switchgear, to reduce the size of the tank 1, it is preferable to dispose the main contact 3 and the auxiliary contact 4 such that, as shown in FIG. 3, the center of a circle 30 enclosing the main and auxiliary contacts 3 and 4 and contacting the outer surfaces thereof is located approximately at the axis of the cylindrical tank 1. However, the link box 12 extends downwards to support the stationary shaft 16 which is a fulcrum of the auxiliary lever 17. Accordingly, the distance $l_1$ between the center of the circle 30 and the bottom end of the box 12 is large, increasing the size of the link box 12. Also, the distance between the tank 1 and the box 12 must be longer than a predetermined length to ensure electrical insulation therebetween. Accordingly, the conventional switchgear has the disadvantages that the inner diameter of the tank is large, increasing the size of the tank.

SUMMARY OF THE INVENTION

To overcome the conventional disadvantages mentioned above, an object of the present invention is to provide a tank-type switchgear in which a link device for driving main and auxiliary contacts is compact, thereby reducing the size of the tank.

With the above object in view, the present invention resides in a tank-type switchgear comprising a main contact disposed in a hollow tank and having movable and stationary contact elements, an auxiliary contact disposed in the tank and electrically connected parallel with the main contact and having movable and stationary contact elements, a main lever rotatably connected to the movable contact element of the main contact, an auxiliary lever rotatably connected at one end thereof to the movable contact element of the auxiliary contact, a connecting link for rotatably supporting the other end of the auxiliary lever, means for rotatably supporting the main lever and the connecting link with respect to the tank, and driving means for rotating the main lever, said auxiliary lever being rotatably connected to the main lever such that the auxiliary lever rotates in the direction opposite the rotational direction of the main lever.

DETAILED DESCRIPTION OF THE PREFERRED EMBODIMENTS

Figure 1:
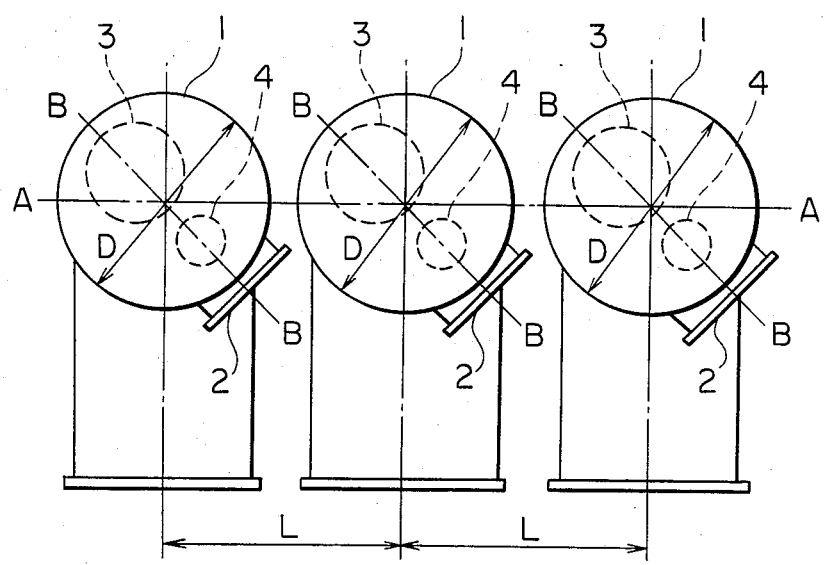
FIG. 1 is a schematic view of the typical configuration of tank-type switchgear.
Figure 2:
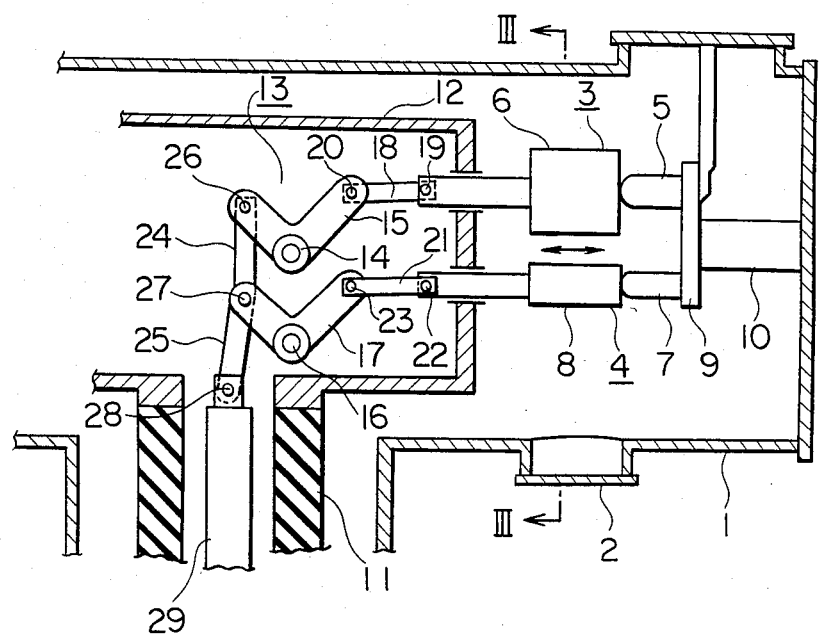
FIG. 2 is a longitudinal sectional view of a conventional tank-type switchgear.
Figure 3:
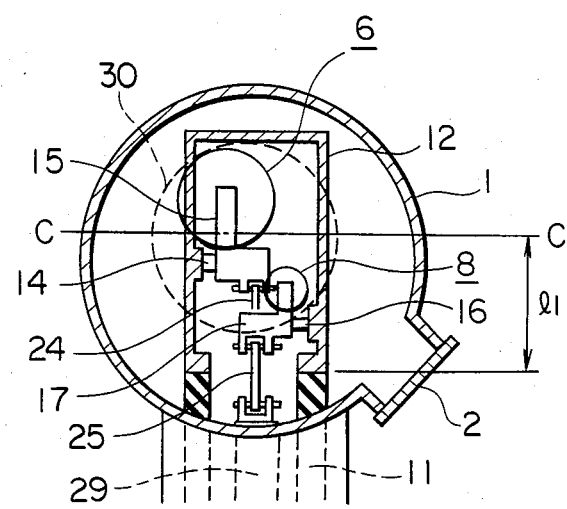
FIG. 3 is a cross-sectional view taken along Line III—III of FIG. 2.

An embodiment of a tank-type switchgear according to the present inventon will now be described while referring to FIGS. 4 and 5 of the accompanying drawings. In the switchgear illustrated in FIGS. 4 and 5, a manhole 52 is formed in the periphery of a cylindrical hollow tank 51 to make it possible to inspect a main contact 53 and an auxiliary contact 54 disposed in the tank 51. The main contact 53 comprises a stationary contact element 55 and a movable contact element 56, and the auxiliary contact 54 comprises a stationary contact element 57 and a movable contact element 58.

The stationary contact elements 55 and 57 of the main and auxiliary contacts are electrically connected to a conductor 59 electrically insulated from and supported by the tank 51 through an insulated support member 60. The movable contact elements 56 and 58 respectively oppose the stationary contact elements 55 and 57, and are connected to a link device 81. The link device 81 is disposed within a link box 62 supported by and electrically insulated from the tank 51 through an insulated cylinder 61. The link device 81 comprises an L-shaped main lever 82 rotatably supported by a stationary shaft 83 secured to the link box 62, and an auxiliary lever 85 rotatably connected by a pin 84 to the leg of the main lever 82 on the side near the contacts at the intermediate portion of the auxiliary lever 85. One end of the main lever 82 is connected to the movable contact element 56 through a link 68 and pins 69 and 70, and the other end of the main lever 82 is connected to a driving rod 79 through a link 74 and pins 76 and 78. The pin 84 is preferably secured to the main lever 82 midway between the stationary shaft 83 and the end of the main lever 82 connected to the link 68. One end of the auxiliary lever 85 is connected to the movable contact element 58 through a link 71 and pins 72 and 73. The other end of the auxiliary lever 85 is rotatably connected by a pin 86 to one end of a link 87 which is rotatably supported by a stationary shaft 88 secured to the box 62. Since the auxiliary lever 85 may be made of a straight bar and has one end located near the auxiliary contact 54 and the other end supported by the stationary shaft 88 through the link 87, as shown in FIG. 4, the stationary shaft 88 can be substantially disposed within the link box 62 in a corner opposite the corner in which the stationary shaft 83 is disposed with respect to the center of the box 62.

Figure 4:
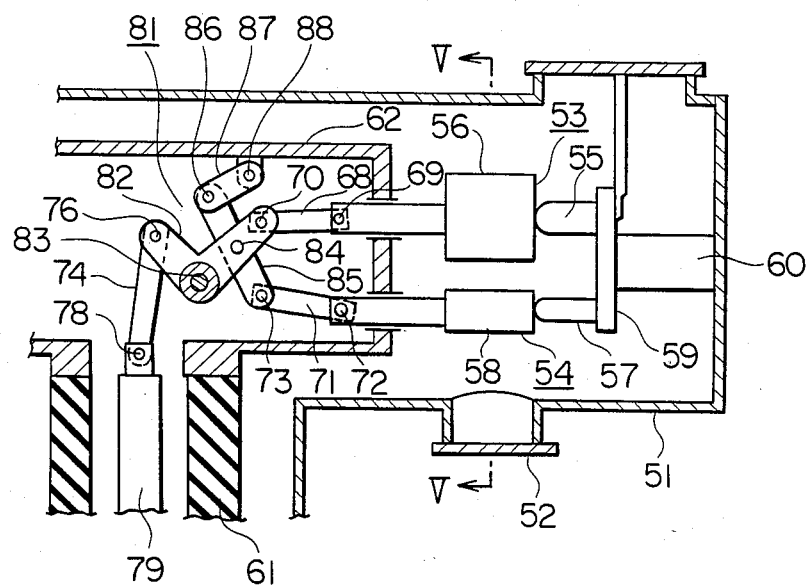
FIG. 4 is a longitudinal sectional view of one embodiment of a tank-type switchgear according to the present invention.

In the switchgear constructed above, when the driving rod 79 is driven downwards by an unillustrated driving apparatus, the main lever 82 is rotated around the shaft 83 in the counterclockwise direction in FIG. 4, thereby moving leftwards the movable contact element 56 of the main contact 53. Simultaneously, since the auxiliary lever 85 is connected to the stationary shaft 88 through the link 87 and the pins 86 and 88, the auxiliary lever 85 is rotated around the pin 86 in the clockwise direction by the rotation of the pin 84 secured to the main lever 82, thereby moving leftwards the movable contact element 58 of the auxiliary contact 54 through the link 71 and the pins 72 and 73. Thus the main and auxiliary contacts 53 and 54 are opened. On the other hand, when the driving rod 79 is moved upwards, the operation of the link device 81 is the reverse of the above operation, and the main and auxiliary contacts 53 and 54 are thereby closed. Thus the auxiliary lever 85 can rotate about the pin 86 in the direction opposite the rotational direction of the main lever 82.

Figure 5:
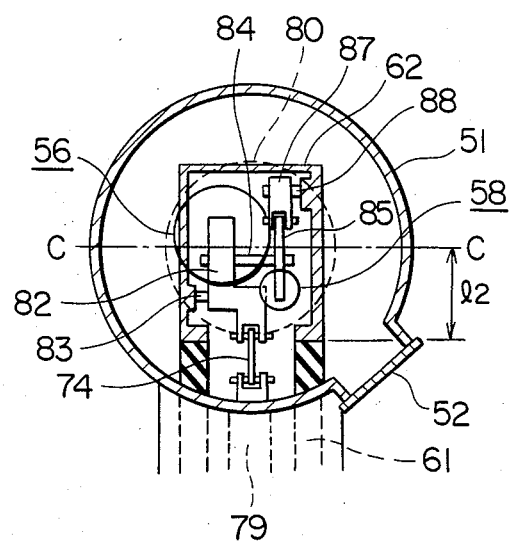
FIG. 5 is a cross-sectional view taken along Line V—V of FIG. 4.

According to the construction stated above, as shown in FIG. 5, the center of a circle 80 enclosing the movable contact elements 56 and 58 and contacting the outer surfaces thereof is located at approximately the axis of the cylindrical tank 51. Therefore, the distance $l_2$ between the bottom end of the box 62 and the central line C—C of the circle 80 is shorter than the distance $l_1$ in the conventional switchgear, so that the link device 81 and thereby the link box 62 are compact and the size of the tank 51 is reduced.

What is claimed is:

1. A tank-type switchgear comprising;
   a main contact disposed in a hollow tank and having movable and stationary contact elements;
   an auxiliary contact which is disposed in the tank and which is electrically connected parallel with the main contact and which has movable and stationary contact elements;
   a main lever rotatably connected to the movable contact element of the main contact;
   an auxiliary lever rotatably connected at one end thereof to the movable contact element of the auxiliary contact;
   a connecting link for rotatably supporting the other end of the auxiliary lever;
   means for rotatably supporting the main lever and the connecting link with respect to the tank; and
   driving means for rotating the main lever; said auxiliary lever being rotatably connected to the main lever such that the auxiliary lever rotates in the direction opposite the rotational direction of the main lever.

2. A tank-type switchgear as claimed in claim 1, wherein said main lever is an L-shaped member and one leg of the main lever is rotatably connected to the driving means and the other leg of the main lever is connected to the movable contact element of the main contact, and said auxiliary lever is rotatably connected to the main lever by a connecting pin.

3. A tank-type switchgear as claimed in claim 2, wherein said supporting means comprises a box disposed inside and secured to the tank, the main and auxiliary levers being disposed in the box, the main lever and the connecting link being rotatably supported by the box.

4. A tank-type switchgear as claimed in claim 3, wherein the main lever and the connecting link are each rotatably supported by a stationary shaft secured to the box.

5. A tank-type switchgear as claimed in claim 2, wherein the auxiliary lever is rotatably connected midway along its length to the other leg of the main lever.

6. A tank-type switchgear as claimed in claim 2, wherein said main and auxiliary levers are respectively rotatably connected to the movable contact elements of the main and auxiliary contacts through connecting links, and the main lever is rotatably connected to the driving means through a connecting link.

* * * * *